United States Patent
Pearson et al.

(10) Patent No.: US 7,186,458 B2
(45) Date of Patent: Mar. 6, 2007

(54) ORIENTED POLYPROPYLENE FILMS FOR ADHESIVE TAPE

(75) Inventors: Scott D. Pearson, Woodbury, MN (US); Patrick J. Hager, Woodbury, MN (US)

(73) Assignee: 3m Innovative Properties Company, St. Paul, MN (US)

( * ) Notice: Subject to any disclaimer, the term of this patent is extended or adjusted under 35 U.S.C. 154(b) by 179 days.

(21) Appl. No.: 10/762,053

(22) Filed: Jan. 21, 2004

(65) Prior Publication Data

US 2004/0151901 A1    Aug. 5, 2004

Related U.S. Application Data

(63) Continuation of application No. 09/331,045, filed as application No. PCT/US98/24105 on Nov. 12, 1998, now Pat. No. 6,797,375.

(51) Int. Cl.
*B32B 27/36* (2006.01)
*C09J 7/02* (2006.01)

(52) U.S. Cl. .................. 428/343; 428/349; 428/523; 428/906; 428/910; 526/348.1

(58) Field of Classification Search .............. 428/343, 428/349, 523, 906, 910; 526/348.1
See application file for complete search history.

(56) References Cited

U.S. PATENT DOCUMENTS

| | | | |
|---|---|---|---|
| 3,241,662 A | 3/1966 | Robinson et al. | |
| 3,324,218 A | 6/1967 | Gebler et al. | |
| 3,372,049 A | 3/1968 | Schaffhausen | |

(Continued)

FOREIGN PATENT DOCUMENTS

EP    0 255 866 A2    2/1988

(Continued)

OTHER PUBLICATIONS

"Viscoelastic Properties of Polymers," 3rd ed., J. D. Ferry, pp. 242-245, John Wiley & Sons, NY (1980).

(Continued)

*Primary Examiner*—Daniel Zirker
(74) *Attorney, Agent, or Firm*—Trisha D. Adamson (57) ABSTRACT

An adhesive tape comprising a backing and a layer of adhesive on the backing. The backing comprises a biaxially oriented substrate which comprises an isotactic polypropylene composition. The tapes and backings of this invention can be severed readily using commercial tape dispensers having metal or plastic cutting teeth to produce cleanly serrated cut edges on the tape. The biaxially oriented substrate is preferably made from a resin comprising an isotactic polypropylene homopolymer having a melt flow rate greater than 8 grams/10 minutes, more preferably greater than 12 grams/10 minutes, and still more preferably greater than about 20 grams/10 minutes. One preferred way to obtain such a resin is to blend:

A) at least one isotactic polypropylene homopolymer "A" having a weight average molecular weight of at least 350,000 grams/mole and melt a flow rate of about 0.5–8 grams/10 minutes, more preferably about 0.5–5 grams/10 minutes; with
B) at least one isotactic polypropylene homopolymer "B" having a weight average molecular weight of at least 100,000 grams/mole and a melt flow rate greater than 8 grams/10 minutes, and preferably greater than about 20 grams/10 minutes, and more preferably greater than about 50 grams/10 minutes.

42 Claims, 6 Drawing Sheets

U.S. PATENT DOCUMENTS

| | | |
|---|---|---|
| 3,887,745 A | 6/1975 | Yoshii et al. |
| 4,330,499 A | 5/1982 | von und zu Aufsess et al. |
| 4,367,322 A | 1/1983 | Shiga et al. |
| 4,393,115 A | 7/1983 | Yoshii et al. |
| 4,414,261 A | 11/1983 | Nanbu |
| 4,447,485 A | 5/1984 | Aritake |
| 4,451,533 A | 5/1984 | Wong et al. |
| 4,595,738 A | 6/1986 | Hufnagel et al. |
| 4,675,582 A | 6/1987 | Hommes et al. |
| 4,825,111 A | 4/1989 | Hommes et al. |
| 4,853,602 A | 8/1989 | Hommes et al. |
| 4,908,278 A | 3/1990 | Bland et al. |
| 5,036,262 A | 7/1991 | Schonbach |
| 5,051,225 A | 9/1991 | Hommes et al. |
| 5,072,493 A | 12/1991 | Hommes et al. |
| 5,284,613 A | 2/1994 | Ali et al. |
| 5,474,820 A | 12/1995 | Murschall et al. |
| 5,539,076 A | 7/1996 | Nowlin et al. |
| 5,549,867 A | 8/1996 | Gessner et al. |
| 5,578,682 A | 11/1996 | White |
| 5,691,043 A | 11/1997 | Keller et al. |
| 6,451,425 B1 | 9/2002 | Kozulla et al. |

FOREIGN PATENT DOCUMENTS

| | | |
|---|---|---|
| EP | 0 459 059 A2 | 12/1991 |
| JP | 45-12221 | 5/1970 |
| JP | 53-34834 | 3/1978 |
| JP | 53-42234 | 4/1978 |
| JP | 5-154905 | 6/1993 |
| WO | WO 94/22948 | 10/1994 |
| WO | WO 97/46367 | 12/1997 |
| WO | WO 97/46368 | 12/1997 |
| WO | WO 97/46369 | 12/1997 |
| WO | WO 98/10016 | 3/1998 |

OTHER PUBLICATIONS

*Proceedings of the 2d World Congress of Chemical Engineering,* Montreal, vol. 6. pp. 333-337 (1981).

Database WPI, Section Ch, Week 197544, Derwent Publications Ltd., London, GB; AN 1975-73055W XP002129705 & JP 50 037843 A (Toyobo KK), Apr. 8, 1975 abstract.

ORIENTED POLYPROPYLENE FILMS FOR ADHESIVE TAPE

CROSS REFERENCE TO RELATED APPLICATIONS

This is a continuation of application Ser. No. 09/331,045, filed Jun. 16, 1999 now U.S. Pat. No. 6,797,375; which was a national stage filing under 35 U.S.C. 371 of PCT/US98/24105 filed Nov. 12, 1998, which International Application was published by the International Bureau in English on May 25, 2000.

TECHNICAL FIELD

The present invention generally relates to biaxially oriented films made from polypropylene and tapes comprising such films.

BACKGROUND OF THE INVENTION

Commercially available pressure sensitive adhesive tapes are usually provided in a roll form on a tape dispenser (see e.g. U.S. Pat. Nos. 4,451,533 and 4,908,278). Tape dispensers typically have either a metal or plastic serrated cutting blade. "Severability" of adhesive tape is defined as the ability to cut or sever a length of tape by pulling the tape over the teeth on the serrated cutting edge of a tape dispenser with a desired amount of energy or work. Severability is also referred to as "dispensability."

It is desired that the severed tape does not chip, sliver, fracture or break in an unpredictable manner (see U.S. Pat. Nos. 4,451,533 and 4,908,278). Such severability is desirable to produce a cleanly serrated cut edge on the severed tape strip. Severability is governed primarily by the mechanical properties of the backing of the adhesive tape. Cleanly serrated edges are preferred for aesthetic reasons in applications such as gift wrapping, mending, and the like. The ease with which an adhesive tape can be severed depends on the deformation and resistance to break (toughness) of the tape backing film, also referred to as the substrate. Typically, the substrate is coated or laminated with surface layers to provide an adhesive surface or a matte or writable surface. The greater the energy required to sever the film, the more extensive the resulting damage to the film will be and the less aesthetically appealing the resulting severed edge. In most cases, energy to sever of the tape is governed primarily by the substrate, with little affect by the adhesive or other layers or coatings. This is believed to be due in part to the elastic strain energy built up during the deformation being suddenly and catastrophically released when the film's inherent strength limit is surpassed. The subsequent failure propagates uncontrollably in a tearing or ripping fashion so that the cut edge does not follow closely the contour of the teeth of the dispenser. The propagation also is directed along the underlying fibril orientation distribution rather than closely following the contour of the dispenser teeth.

The majority of commercially available biaxially oriented polypropylene film is produced by the flat film or tenter stretching process. Typical tenter processes serve to biaxially stretch films either predominately simultaneously or predominately sequentially. Sequential tenter stretching is currently the most widely used biaxial film processing method. Typically, a thick sheet is extruded and rapidly quenched to form spherules having α-morphology with a monoclinic unit cell. This thick sheet is then reheated to a suitable stretching temperature and stretched in a first lengthwise or longitudinal stretching step, followed by a second transverse stretching step and then the film is annealed to produce a flat film having uniform thickness. Simultaneous tenter stretched films comprise a minor part of the film backing market because, although such processes can continuously stretch films in both longitudinal and transverse directions, they have historically proven costly, slow, and inflexible regarding allowable drawing ratios.

Commercially available biaxially oriented polypropylene films are well known for their toughness, moisture stability, good color, slivering resistance, and clarity and have long been used as adhesive tape backings (see U.S. Pat. Nos. 3,241,662 and 3,324,218). Such films are produced typically with so-called "film grade" isotactic polyproylene resins having high molecular weight and low melt flow rates between about 2–8 grams/10 minutes as measured using ASTM D 1238-95.

High molecular weight polyolefin resins are well known in the art to produce biaxially oriented film having uniform stretch and thickness, without hardbands, wrinkles or other defects. High molecular weight imparts cohesive strength to the cast sheet, allowing uniform stretching at the strain rates typical of commercial biaxial film stretching equipment, especially the high strain rates that can occur in sequential biaxial orientation film lines.

However, especially in the sequential biaxial orientation case, high molecular weight produces film having high toughness, and adhesive tapes produced from such films tend to elongate significantly before breaking while under load, which renders such tapes extremely difficult to sever, particularly on a plastic-bladed dispenser. The elongation to break for such tapes results in an undesirably large amount of work on the part of the user.

It is known to add other components to polypropylene resin to improve processability or improve severability for production of adhesive tape backing films.

Small amounts (less than about 10% by weight) of low molecular weight additives like waxes or lubricants can be employed to allow the cast web to be more easily stretched to a film by reducing the internal friction between polymer chains as they slide past each other. WO 97/46369 discloses use of a polypropylene wax additive, by which the execution of a process for preparing a biaxially stretched polypropylene film at high speeds and with high reliability will be possible.

Components like hydrocarbon tackifiers, high Tg polymers and the like can be added to enhance the film brittleness and thereby reduce the work required to sever the film. Such materials may prove difficult to process or impart undesirable stiffness, opacity, off-colors, and higher cost to the finished film.

JP 53-34834 discloses a biaxially oriented polypropylene based adhesive tape with cutting properties formed from a polymer mixture containing 20–80% of polypropylene and 80–20% of a low molecular weight polyolefin. It is further disclosed that in the case when the molecular weight of the low molecular weight polyolefin becomes greater than 20,000 grams/mole, it becomes a material where the cutting properties are significantly deteriorated.

U.S. Pat. No. 3,887,745 discloses a finger-tearable adhesive tape with a film base comprising a layer of polypropylene polymer film which is biaxially oriented and at least one other layer of a polypropylene polymer film which is uniaxially oriented in a transverse direction, the melting point of the uniaxially oriented film being 0.5–10° C. higher than the melting point of the biaxially oriented film, and the total thickness of the uniaxially oriented film being 1.2–5.0 times greater than the total thickness of the biaxially oriented film.

U.S. Pat. No. 4,393,115 discloses a laminate film having hand-cutting properties comprising a biaxially oriented polypropylene layer and a uniaxially oriented polypropylene layer oriented only in the width direction, laminated with a stretched thin surface layer of propylene-ethylene block copolymer. The thickness of the uniaxially oriented layer is in the range between about 1.2 and 5.0 times the thickness of the biaxially oriented polypropylene layer.

U.S. Pat. No. 4,414,261 discloses a severable polypropylene adhesive tape having a base sheet comprising an intermediate layer made of crystalline polypropylene containing from 25 to 35% by weight of a petroleum resin and outer layers made of a crystalline polypropylene laminated on both sides of the intermediate layer, the thickness of the intermediate layer is within a range from 60 to 90% of the base sheet.

U.S. Pat. No. 4,447,485 discloses an adhesive tape with finger-tearability and severability comprising a base sheet of a polypropylene resin containing from 5 to 50% by weight of a methylpentene polymer and a subsidiary layer formed on one or both sides of the main layer composed of crystalline polypropylene having a melting point of at least the melting point of the methylpentene polymer, and a bonding layer of a carboxylic acid-modified polypropylene.

U.S. Pat. No. 5,474,820 discloses a multilayer polypropylene film comprising a base layer of polypropylene and at least one outer layer containing a mixture of HDPE and one or more olefin homopolymers, copolymers or terpolymers and the film has a silk-matte finish. The polypropylene polymer of the base layer has a melting point of at least 140° C. and the melt flow index is in the range of 0.5–15 grams/10 minutes.

SUMMARY OF THE INVENTION

The present invention provides biaxially oriented substrates comprising isotactic polypropylene compositions. Such biaxially oriented substrates are well suited for use as adhesive tape backings. The tapes and backings of this invention can be severed readily using commercial tape dispensers having metal or plastic cutting teeth to produce cleanly serrated cut edges on the tape. That is, the preferred adhesive tapes and backings described herein have a serrated edge that closely follows the contour of the serrated cutting teeth when tested by the Dispense Test—Metal Blade or the Dispense Test—Plastic Blade described herein.

In one aspect, the present invention provides an adhesive tape comprising a backing and a layer of adhesive on the backing. The backing comprises a biaxially oriented substrate which comprises an isotactic polypropylene composition.

Preferably, the biaxially oriented substrate comprises an isotactic polypropylene composition such that the backing has the following properties taken individually or in any desirable combination:
A) an elongation to break of from 40% to 170%;
B) an energy to sever of up to 350 N-cm/cm$^2$ when severed according to The Dispense Test—Metal Blade;
C) an energy to sever of up to 700 N-cm/cm$^2$ when severed according to The Dispense Test—Plastic Blade; and
D) an elongation of up to 4% when severed according to either The Dispense Test—Metal Blade or The Dispense Test—Plastic Blade.

The above characteristics are defined with respect to the backing without adhesive present. It is expected that adhesive has little impact on the characteristics described above.

In one preferred embodiment, the biaxially oriented substrate comprises a polypropylene composition such that the biaxially oriented substrate has the following characteristics taken individually or in any desirable combination:
A) a weight average molecular weight of at least 100,000 grams/mole;
B) a melt flow rate of at least 8 grams/10 minutes, more preferably 12 grams/10 minutes, and most preferably 20 grams/10 minutes;
C) a high isotacticity content greater than about 90% as measured by n-heptane soluble fraction of less than about 15% by weight or having at least 60% isotactic pentads as determined by $^{13}$C-NMR analysis; and
D) a density preferably of about 0.86–0.92 grams/cm$^3$, more preferably about 0.88–0.91 grams/cm$^3$.

The biaxially oriented substrate is preferably made from a resin comprising an isotactic polypropylene homopolymer having a melt flow rate greater than 8 grams/10 minutes, more preferably greater than 12 grams/10 minutes, and still more preferably greater than about 20 grams/10 minutes.

The resin also preferably has:
A) a high isotacticity content greater than about 90% as measured by n-heptane soluble fraction content of less than about 15% by weight or having at least 60% isotactic pentads as determined by C-13 nuclear magnetic resonance (NMR) analysis;
B) a weight average molecular weight (Mw) of at least 100,000 grams/mole;
C) a density of 0.86–0.92 grams/cm$^3$, preferably 0.88–0.91 grams/cm$^3$; and
D) a melting point temperature of about 160–166° C.

One preferred way to obtain such a resin is to blend:
A) at least one isotactic polypropylene homopolymer "A" having a weight average molecular weight of at least 350,000 grams/mole as determined by size exclusion chromatography and melt a flow rate of about 0.5–8 grams/10 minutes, more preferably about 0.5–5 grams/10 minutes; with
B) at least one isotactic polypropylene homopolymer "B" having a weight average molecular weight of at least 100,000 grams/mole as determined by size exclusion chromatography and a melt flow rate greater than 8 grams/10 minutes, and preferably greater than about 20 grams/10 minutes, and more preferably greater than about 50 grams/10 minutes. The practical upper limit for the melt flow rate of Resin B may be about 350–400 grams/10 minutes, although the present invention is not so limited. The preferred upper limit is about 150 grams/10 minutes. Resin B should have a sufficiently high molecular weight to exhibit molecular chain entanglement behavior, that is to behave as a solid at ambient temperature and exhibit elasticity and melt strength.

Resins A and B each also preferably have:
A) a high isotacticity content greater than about 90% as measured by n-heptane soluble fraction content of less than about 15% by weight or having at least 60% isotactic pentads as determined by C-13 nuclear magnetic resonance (NMR) analysis;
B) a density of 0.86–0.92 grams/cm$^3$, preferably 0.88–0.91 grams/cm$^3$; and
C) a melting point temperature of about 160–166° C.

Resins A and B can be melt mixed together and formed into a sheet and biaxially oriented to produce an adhesive tape backing, or arranged as discrete layers in a multilayer film or some combination of the two and then biaxially oriented to produce an adhesive tape backing.

The biaxially oriented isotactic polypropylene substrate thus formed from the resin or resins described herein has a melt flow rate greater than about 8 grams/10 minutes and preferably less than about 100 grams/10 minutes, and has improved severability on commercially available adhesive tape dispensers.

The melt flow rates of A and B and the relative amounts of each are selected such that the backing and the biaxially oriented substrate have the desired properties and characteristics described herein.

Additionally, the resin may be a blend of three or more resins that satisfy the requirements of A and B stated above.

When using a blend, resins A and B may be mixed together in any desirable weight combinations, preferably with Resin A present in an amount from about 5 to 80 wt %, more preferably from about 20 to 70 wt %, and with Resin B preferably present in an amount of from 20 to 95 wt %, more preferably from about 30 to 80 wt %.

In one preferred embodiment, the biaxially oriented substrate is a monolayer.

In another preferred embodiment, biaxially oriented substrate is of multilayer construction. In preferred multilayer biaxially oriented substrate comprises discrete layers each made from a resin meeting the requirements of Resin A or B. Additionally, layers not meeting the requirements of Resins A or B may be included either as the outermost layers or within a multilayer construction. In such a case, the composite biaxially oriented substrate preferably has at least 50% of the thickness containing at least 90% isotactic polypropylene. Stated another way, of the layers that together make up the biaxially oriented substrate, the layers comprising at least 90% isotactic polypropylene account for at least 50% of the total thickness of the biaxially oriented substrate. Preferably, the multilayer biaxially oriented substrate has a composite melt flow rate of greater than about 8 grams/10 minutes, more preferably greater than 12 grams/10 minutes, and most preferably at least 20 grams/10 minutes. The multilayer biaxially oriented substrate has a composite melt flow rate of preferably less than about 100 grams/10 minutes. Furthermore, the backing comprising a multilayer biaxially oriented substrate has the desired severance energy and elongation described herein.

The present invention comprises the desirable adhesive tapes described herein. The present invention also comprises the preferred backings described herein. The present invention also comprises the preferred biaxially oriented substrates described herein, in which case those characteristics described with respect to the backing apply to the biaxially oriented substrate. Such preferred biaxially oriented substrates may be monolayer or multilayer, with monolayer being preferred. The present invention also comprises the preferred resins and blends described herein which may be oriented to provide the preferred biaxially oriented substrates and/or backings described herein.

Certain terms are used in the description and the claims that, while for the most part are well known, may require some explanation. "Area stretch ratio," as used herein, indicates the ratio of the area of a given portion of a stretched film to the area of the same portion prior to stretching. For example, in a biaxially stretched film having an area stretch ratio of 36:1, a given 1 cm$^2$ portion of unstretched film would have an area of 36 cm$^2$ after stretch.

"Biaxially oriented," when used herein to describe a film, indicates that the film has been stretched in two different directions in the plane of the film. Typically, but not always, the two directions are perpendicular. Biaxially oriented films may be sequentially stretched, simultaneously stretched, or stretched by some combination of simultaneous and sequential stretching. "Simultaneously biaxially oriented," when used herein to describe a film, indicates that significant portions of the stretching in each of the two directions are performed simultaneously.

Molecular weight and molecular weight distribution affect polymer process and mechanical properties. Polymer molecular weight is typically expressed as a weight average molecular weight. Typically, the molecular weight of commercially available polyolefin resins is estimated by measuring the melt flow rate ("MFR"), which increases with decreasing molecular weight and hence melt viscosity. Commercial film grade isotactic polypropylene resins for use in biaxial orientation equipment typically have a MFR in the range from about 1–6 grams/10 minutes. At very high MFR values, biaxial orientation of polypropylene resins becomes increasingly difficult because of a lack of melt strength at useful commercial equipment speeds during the stretching operation.

Unless specified otherwise, all values of melt flow rate of inventive resins and films described herein are provided in units of grams/10 minutes measured according to ASTM D 1238-95, Flow Rates of Thermoplastics by Extrusion Plastometer, Procedure B, Condition 230/2.16.

The molecular weight distribution is often characterized by the polydispersity index which typically is the ratio of the weight average molecular weight to the number average molecular weight. The polydispersity index affects processability of polypropylene resins and also the mechanical properties of the resultant biaxially oriented film. The polydispersity index can be determined by measuring the dynamic shear properties of the polypropylene melt (see *Proceedings of the 2d World Congress of Chemical Engineering*, Montreal, vol. 6, pp. 333–337 (1981)). Preferably, the films of this invention have polydispersity index values between about 2 and 8, more preferably between about 2.5 and 7.

A minimum molecular weight or chain length is required to develop strength in uncrosslinked polymers. The minimum chain length is called the critical chain entanglement molecular weight (Mc) and defines the chain length required for the onset of chain entanglements. Chain entanglements provide topological constraints to chain motion, and allow the polymer to behave like a crosslinked network and bear stress; this ability is sometimes known as green strength or web strength. Below the Mc, uncrosslinked polymer systems have no such constraints and therefore lack elasticity and undergo chain slippage and large scale stress relaxation.

For many polymers, Mc is taken as the inflection point observed for polymers in plots of viscosity against increasing molecular weight ("*Viscoelastic Properties of Polymers,*" 3$^{rd}$ ed., J. D. Ferry, p. 242, John Wiley & Sons, NY (1980)). For molecular weights below Mc, polymer viscosity increases with the first power of molecular weight, that is, the viscosity and molecular weight increase monotonically. With decreasing chain length below Mc the polymer behaves first like a wax and finally as a viscous liquid. Above Mc, however, the polymer behaves as a viscoelastic solid and viscosity increases with molecular weight to the 3.4 power; this much greater dependence of viscosity on molecular weight is explained as the effect of entanglements in constraining chain motions and increasing viscosity. Mc can therefore be interpreted as the transition between wax behavior and polymer behavior.

It is often desirable to provide very clear plastic film for use in clear adhesive tapes, packaging, and other applications. The adhesive tape backings herein described in this invention exhibit good clarity and low haze. The biaxially oriented polypropylene film of the present invention displays reduced haze in transmission compared to films which do not meet the requirements of this invention. The oriented films of the present invention preferably are optically clear to the unaided eye under typical interior lighting conditions. More preferably, the films have a haze of less than 5% as measured by ASTM D1003-95.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
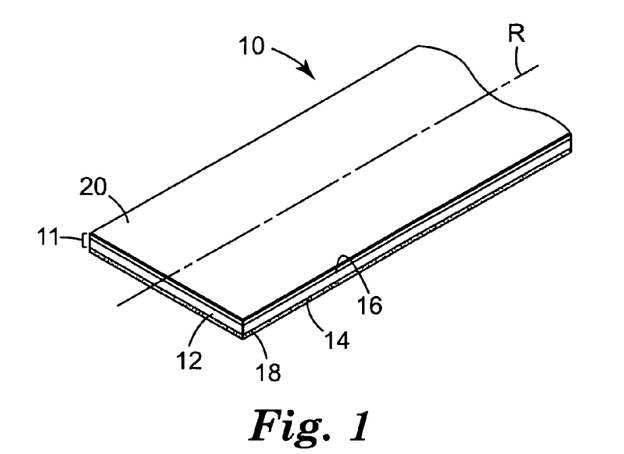
FIG. 1 is an isometric view of a length of tape according to the present invention.

Referring to FIG. 1, there is shown a length of tape 10 according to one preferred embodiment of the present invention. Tape 10 comprises a film backing 11 and a layer of adhesive 18. Backing 11 includes a biaxially oriented substrate 12. The biaxially oriented substrate may be a monolayer or a multilayer film. Biaxially oriented substrate 12 includes first major surface 14 and second major surface 16. Preferably, backing 11 has a thickness in the range of about 0.002 to about 0.005 centimeters. Biaxially oriented substrate 12 is coated on first major surface 14 with a layer of adhesive 18. Adhesive 18 may be any suitable adhesive as is known in the art. Backing 11 may include an optional release or low adhesion backsize layer 20 coated on the second major surface 16 of the biaxially oriented substrate 12 as is known in the art. In one preferred embodiment, biaxially oriented substrate 12 comprises a biaxially oriented monolayer polypropylene film as described herein. Backing 12 alternatively may comprise a multilayer backing, at least one of which layers comprises a biaxially oriented polypropylene film as described herein.

Biaxially oriented substrate 12 includes those portions of the backing 11 that were biaxially oriented. Biaxially oriented substrate 12 may comprise a monolayer film or a multilayer or laminated film. Preferably, biaxially oriented substrate 12 comprises a monolayer film. Backing 11 may include optional coatings 20 that are applied to biaxially oriented substrate 12. Such coatings may comprise, for example, a low adhesive backsize coating, a coating which accepts writing or printing, a coating that provides a matte finish, or the like. Tape 10 thus comprises a backing 11 and adhesive 18. The backing 11 comprises biaxially oriented substrate 12 and optional coatings 20, if present.

Preferably, the biaxially oriented substrate 12 comprises an isotactic polypropylene composition such that the backing 11 has the following properties taken individually or in any desirable combination:

A) an elongation to break of from 40% to 170%;

B) an energy to sever of up to 350 N-cm/cm$^2$ when severed according to The Dispense Test—Metal Blade;

C) an energy to sever of up to 700 N-cm/cm$^2$ when severed according to The Dispense Test—Plastic Blade; and D) an elongation of up to 4% when severed according to either The Dispense Test—Metal Blade or The Dispense Test—Plastic Blade.

The above characteristics are defined with respect to the backing 11 without adhesive 18 present. It is expected that adhesive 18 has little impact on the characteristics described above.

In one preferred embodiment, the biaxially oriented substrate 12 comprises a polypropylene composition such that the biaxially oriented substrate has the following characteristics taken individually or in any desirable combination:

A) a weight average molecular weight of at least 100,000 grams/mole;

B) a melt flow rate of at least 8 grams/10 minutes, more preferably 12 grams/10 minutes, and most preferably 20 grams/10 minutes;

C) a high isotacticity content greater than about 90% as measured by n-heptane soluble fraction of less than about 15% by weight or having at least 60% isotactic pentads as determined by $^{13}$C-NMR analysis; and D) a density preferably of about 0.86–0.92 grams/cm$^3$, more preferably about 0.88–0.91 grams/cm$^3$.

The biaxially oriented substrate 12 is preferably made from a resin comprising an isotactic polypropylene homopolymer having a melt flow rate greater than 8 grams/10 minutes, more preferably greater than 12 grams/10 minutes, and still more preferably greater than about 20 grams/10 minutes.

The resin also preferably has:

A) a high isotacticity content greater than about 90% as measured by n-heptane soluble fraction content of less than about 15% by weight or having at least 60% isotactic pentads as determined by C-13 nuclear magnetic resonance (NMR) analysis;

B) a weight average molecular weight (Mw) of at least 100,000 grams/mole;

C) a density of 0.86–0.92 grams/cm$^3$, preferably 0.88–0.91 grams/cm$^3$; and

D) a melting point temperature of about 160–166° C.

One preferred way to obtain such a resin is to blend:

A) at least one isotactic polypropylene homopolymer "A" having a weight average molecular weight of at least 350,000 grams/mole as determined by size exclusion chromatography and melt a flow rate of about 0.5–8 grams/10 minutes, more preferably about 0.5–5 grams/10 minutes; with B) at least one isotactic polypropylene homopolymer "B" having a weight average molecular weight of at least 100,000 grams/mole as determined by size exclusion chromatography and a melt flow rate greater than 8 grams/10 minutes, and preferably greater than about 20 grams/10 minutes, and more preferably greater than about 50 grams/10 minutes. The practical upper limit for the melt flow rate of Resin B may be about 350–400 grams/10 minutes, although the present invention is not so limited. The preferred upper limit is about 150 grams/10 minutes. Resin B should have a sufficiently high molecular weight to exhibit molecular chain entanglement behavior, that is to behave as a solid at ambient temperature and exhibit elasticity and melt strength.

Resins A and B each also preferably have:
A) a high isotacticity content greater than about 90% as measured by n-heptane soluble fraction content of less than about 15% by weight or having at least 60% isotactic pentads as determined by C-13 nuclear magnetic resonance (NMR) analysis;
B) a density of 0.86–0.92 grams/cm$^3$, preferably 0.88–0.91 grams/cm$^3$; and
C) a melting point temperature of about 160–166° C.

Resins A and B can be melt mixed together and formed into a sheet and biaxially oriented to produce an adhesive tape backing, or arranged as discrete layers in a multilayer film or some combination of the two and then biaxially oriented to produce an adhesive tape backing.

The biaxially oriented isotactic polypropylene substrate 12 thus formed from the resin or resins described herein has a melt flow rate greater than about 8 grams/10 minutes and preferably less than about 100 grams/10 minutes, and has improved severability on commercially available adhesive tape dispensers.

The melt flow rates of A and B and the relative amounts of each are selected such that the backing and the biaxially oriented substrate have the desired properties and characteristics described herein.

Additionally, the resin may be a blend of three or more resins that satisfy the requirements of A and B stated above.

When using a blend, resins A and B may be mixed together by any of the well known plasticating shear mixing equipment such as extrusion mixing in any desirable weight combinations, preferably with Resin A present in an amount from about 5 to 80 wt %, more preferably from about 20 to 70 wt %, and with Resin B preferably present in an amount of from 20 to 95 wt %, more preferably from about 30 to 80 wt %. At weight compositions with Resin B in excess of about 80% the material may become difficult to process, however, the actual limit in composition is determined by the particular process and equipment employed and therefore depends on strain rate during stretching, temperature profiles, magnitude of stretching and the like.

When using a blend, the resin blends may be prepared by any known mixing operation, but preferably are prepared by extrusion mixing of dry components prior to film stretching or separately to produce pellets for later use.

Although processability may be simplified by biaxially orienting a single layer to produce film, this invention is not so limited. A plurality of layers may be incorporated in the biaxially oriented substrate 12. For example, rather than blending resins A and B and extruding a monolayer film, a multilayer film may be laminated or coextruded comprising discrete layers each made from a resin meeting the requirements of Resin A or B. Additionally, layers not meeting the requirements of Resins A or B may be included either as the outermost layers or within a multilayer construction. In such a case, the composite biaxially oriented substrate 12 has at least 50% of the thickness containing at least 90% isotactic polypropylene. Stated another way, of the layers that together make up the biaxially oriented substrate 12, the layers comprising at least 90% isotactic polypropylene account for at least 50% of the total thickness of the biaxially oriented substrate 12. Additionally, the multilayer biaxially oriented substrate 12 has a composite melt flow rate of greater than about 8 grams/10 minutes, more preferably greater than 12 grams/10 minutes, and most preferably at least 20 grams/10 minutes. The multilayer biaxially oriented substrate 12 has a composite melt flow rate of preferably less than about 100 grams/10 minutes. Furthermore, the backing 11 has the desired severance energy and elongation described herein.

Further, it is anticipated that resins, or blends of two or more resins, at least one of which initially have a melt flow rate below 8 grams/10 minutes, could be used if the polypropylene is subsequently degraded or oxidized to MFR values of about 8 grams/10 minutes or higher, preferably up to 150 grams/10 minutes.

It is well known that, in film processing, edge trim is often recycled to the extrusion process, either with or without repelletizing. In this regard, if the edge trim is below 8 MFR it may be considered as additional Resin A as described above and if it is above 8 MFR it may be considered as additional Resin B as described above. Preferably, edge trim would be above 8 MFR and below 150 MFR and considered as additional Resin B.

The polydispersity index is preferred to be between about 2 and 8, more preferably between about 2.5 and 7.5 as measured according to ASTM D 4065-95. Typically, low polydispersity index polypropylene resins are difficult to process on commercial biaxial orientation equipment, although it is anticipated that using such resins may reduce the severing energy of the biaxially oriented substrate. A high polydispersity index or broad molecular weight distribution resin may be easier to process, but is anticipated to promote higher severing energy. Thus, a balancing of molecular weight or MFR and the molecular weight distribution may be desirable in application of the present invention The compositions meeting the characteristics described herein are preferably homopolymers. When the resins are referred to herein, including the claims, as a homopolymer, this also includes resins having therein co-polymer in an amount small enough that the desired characteristics and properties of the resin and film are still met.

In film processing, polymer resins are subjected to high shearing stresses at high temperature. In a typical industrial extrusion system, polypropylene molecular weight degrades somewhat due to chain scission. During processing, the longest polymer molecules are degraded to a larger degree than the shorter molecules. Therefore, for a given resin the film molecular weight may be lower than the resin molecular weight.

The polypropylene composition can be cast into sheet form as is known in the art, to prepare a sheet suitable for stretching to arrive at the preferred biaxially oriented substrate 12 described herein. One suitable method to cast a sheet is to feed the resin into the feed hopper of a 4.45 cm single screw extruder manufactured by H. P. M. (of Mt. Gilead, Ohio) having an extruder barrel temperature adjusted to produce a stable homogeneous melt. The polypropylene melt can be extruded through a 17.8 cm single manifold sheet die onto a rotating water cooled steel casting wheel having 50–60° C. water circulating through it. The cast sheet can be quenched by passing through a water bath maintained at about 30° C. to produce a cast sheet having a thickness of about 0.12–0.16 cm.

The sheet is then biaxially oriented to provide biaxially oriented substrate 12 having the desired characteristics and properties described herein.

The preferred properties described herein may be obtained by any suitable method and apparatus for biaxially orienting the biaxially oriented substrate 12. Of all stretching methods, the methods most preferred for commercial manufacture of films for tape backings include biaxial stretching by mechanical tenter such as the methods and apparatus disclosed in U.S. Pat. Nos. 4,330,499 and 4,595,738, and more preferably by the methods and tenter apparatus for simultaneous biaxial stretch disclosed in U.S. Pat. Nos. 4,675,582; 4,825,111; 4,853,602; 5,036,262; 5,051,225; and 5,072,493. Although biaxially stretched films can be made by tubular blown film or flat film tenter stretching processes, it is preferable that the films of this invention, when used as tape backings, be made by a flat film tenter stretching process to avoid thickness variations and processing difficulties typically associated with tubular blown film processes.

Flat film tenter stretching can be accomplished by sequential or simultaneous stretching processes. The simultaneous process surprisingly permits for the incorporation of greater levels of resin B which in turn impart more desirable properties including improved severability and clarity. An additional advantage of such a process is that the film surfaces do not contact stretching rollers as in the case of commercially available sequential film stretching lines, which preserves the film surface from defects caused by roller contact. In addition, other defects like thickness variability, die lip instabilities, hardbands and the like are minimized in comparison to tubular or blown film stretching processes.

The polypropylene composition is selected to allow biaxial stretch to an area stretch ratio of at least 36:1. The polypropylene composition also preferably allows stretch at occur at a line speed of at least 30 meters/minute.

The biaxially oriented substrates 12 useful in this invention, when used as a backing 11 for a tape 10, preferably have a final thickness between about 0.002–0.005 cm. Variability in film thickness is preferably less than about 5%. Thicker and thinner films may be used, with the understanding that the film should be thick enough to avoid excessive flimsiness and difficulty in handling, while not being so thick so as to be undesirably rigid or stiff and difficult to handle or use.

Backing 11 may optionally include additives and other components as is known in the art, preferably in an amount selected so as not to adversely affect the tensile and dispense properties attained by the preferred embodiments described herein. For example, the films of the present invention may contain fillers, plasticizers, colorants, lubricants, processing aids, nucleating agents, ultraviolet-light stabilizing agents, and other additives. Typically such materials are added to a polymer before it is made into an oriented film (e.g., in the polymer melt before extrusion into a film). Organic fillers may include organic dyes and resins, as well as organic fibers such as nylon and polyimide fibers. Inorganic fillers may include pigments, fumed silica, calcium carbonate, talc, diatomaceous earth, titanium dioxide, carbon fibers, carbon black, glass beads, glass bubbles, mineral fibers, clay particles, metal particles and the like. Other additives such as flame retardants, stabilizers, antioxidants, compatibilizers, antimicrobial agents (e.g., zinc oxide), electrical conductors, and thermal conductors (e.g., aluminum oxide, boron nitride, aluminum nitride, and nickel particles) can be blended into the polymer used to form the film.

The adhesive 18 may be any suitable adhesive as is known in the art. Preferred adhesives are those activatable by pressure, heat or combinations thereof. Suitable adhesives include those based on acrylate, rubber resin, epoxies, urethanes or combinations thereof. The adhesive 18 may be applied by solution, water-based or hot-melt coating methods. The adhesive may be applied in any desired amount, and typically is applied to provide a conventional dry coating weight between about 0.0015 to 0.005 grams/cm$^2$.

The backing 11 may be optionally treated by exposure to flame or corona discharge or other surface treatments including chemical priming to improve adhesion of subsequent coating layers. In addition, the second surface 16 may be coated with optional low adhesion backsize materials 20 to restrict adhesion between the opposite surface adhesive layer 18 and the backing 11, thereby allowing for production of adhesive tape rolls capable of easy unwinding, as is well known in the adhesive coated tape-making art.

Such a tape 10 is particularly well-suited for light duty home and office use or for other uses like die-cut tapes or other die-cut substrates.

Figure 2:
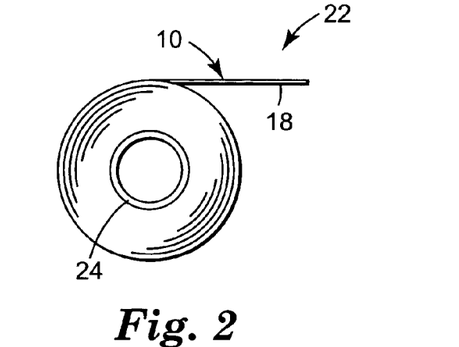
FIG. 2 is a side view of a roll of adhesive tape according to the present invention.
Figure 3:
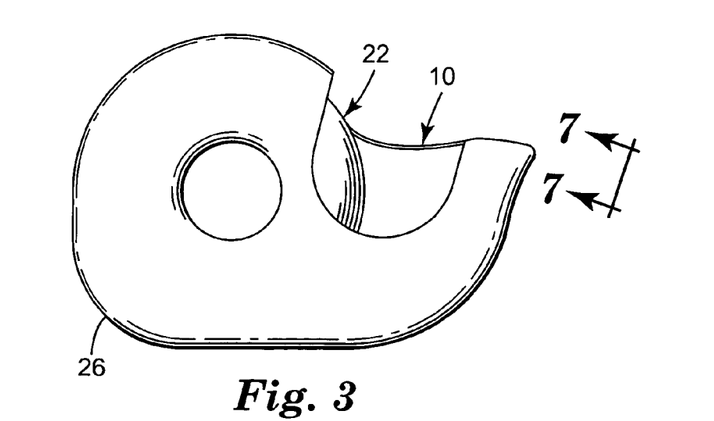
FIG. 3 is a side view of a roll of tape on a dispenser according to the present invention.

In one preferred embodiment, tape 10 is provided in the form of a spirally wound roll 22 wound up in direction R and optionally on a core 24 as illustrated in FIG. 2. Such rolls can be provided on a table top or hand held dispenser 26 as illustrated in FIG. 3. The dispensers can include a metal cutting blade or plastic cutting blade. Preferred dispensers include those available as SCOTCH brand Cat. 15 or Cat. 40 tabletop tape dispenser equipped with metal cutting blades, SCOTCH brand Cat. 25 or Cat. H-125/126 plastic two-piece plastic dispensers equipped with metal cutting blades, and SCOTCH brand Cat. 104 or Cat. 105 injection-molded polystyrene dispensers with plastic cutting blades, all available from Minnesota Mining and Manufacturing Company, St. Paul, Minn.

The details of converting film backings into tapes is well within the skill of those in the art, and need not be described in any greater detail herein. See, for example, U.S. Pat. No. 4,451,533, "Dispensable Polypropylene Adhesive-Coated Tape," (Wong et al).

The operation of the present invention will be further described with regard to the following detailed examples. These examples are offered to further illustrate the various specific and preferred embodiments and techniques. It should be understood, however, that many variations and modifications may be made while remaining within the scope of the present invention.

Test Methods

Tensile Properties

ASTM D-882-95A, Tensile Properties of Thin Plastic Sheeting, Method A

The tensile elongation-at-break of backings was measured by the procedures described in ASTM D-882-95A, "Tensile Properties of Thin Plastic Sheeting," Method A. The backings were conditioned for 24 hours at 25° C. and 50% relative humidity. The tests were performed using a tensile-testing machine commercially available as a Model 400/S, from MTS Systems Corporation, Eden Prairie, Minn. Specimens for this test were 1.91 cm wide and 15 cm in length. An initial jaw separation of 10.2 cm and a crosshead speed of 30 cm/min were used. Specimens were tested for each sample in the reference direction of the film. Results are reported in Table 2 below. The elongation-to-break values are reported for the reference direction based on the initial gauge length of the sample. As used herein, including the claims, the term "tensile elongation to break" is used to describe results obtained by the just-described method.

Melt Flow Rate: ASTM D 1238-95, Flow Rates of Thermoplastics by Extrusion Plastometer The melt flow rate of the resins and backing samples were measured using the procedures described in ASTM D 1238-95, Flow Rates of Thermoplastics by Extrusion Plastometer, Procedure B, Condition 230/2.16. A Tinius-Olsen Extrusion Plastometer Model U-E-4-78, Willow Grove, Pa., equipped with a mechanically actuated timer was used. A one-inch piston arm travel distance was used for all samples. Samples were charged into the heated plastometer and the residence time prior to measurement was kept at 7.0±0.5 minutes. When films are tested, the film sample is rolled up and introduced into the apparatus.

Weight Average Molecular Weight (Mw):

ASTM D 5296-92, Molecular Weight Averages by Size Exclusion Chromatography (SEC)

The weight average molecular weights (Mw) were measured using ASTM D 5296-92, Molecular Weight Averages by Size Exclusion Chromatography (SEC). A Waters 150C chromatograph (Waters Corporation, Milford, Mass.) equipped with a two-column set (Jordi Associates mixed bed with 500 angstrom pore size) was used. Samples were in the form of pellet, cast sheet, or stretched film.

10.0 ml of 1,2,4-trichlorobenzene (TCB) containing 0.1% Ionol (antioxidant) and Phosphite 168 (high temperature stabilizer) were added to approximately 25 mg of sample and dissolved by heating at 160° C. for 12.0 hrs. The solutions were then filtered using the internal filtration system (0.5 micrometer) of the Waters 150C instrument, and 150 microliters of each solution were injected into the chromatograph operating at a temperature of 140° C. and an eluent (TCB) rate of 1.0 ml/min. Concentration changes were measured using an internal refractive index detector. The weight average molecular weights (Mw) were calculated using a Dell computer equipped with Polymer Labs PL Caliber software, based on a calibration made of narrow dispersity polystyrene standards ranging in Mw from $6.30 \times 10^6$ to 800 grams/mole.

ASTM D 4065-95, Polydispersity Index by Measurement of Dynamic Mechanical Properties of Plastics The polydispersity index of both polypropylene composition and film was measured according to ASTM D 4065-95, using a Rheometrics Dynamic Mechanical Spectrometer (Rheometrics Scientific Incorporated, Piscataway, N.J.) oscillating disc rheometer. Sample film or resin was placed between two 25 mm diameter parallel plates with a gap of about 1–3 mm in an oven at 200° C., and subjected to an oscillatory strain sweep in the frequency range of 0.1 to 400 radians per second. The dynamic stress response was measured and values of the storage modulus G' and loss modulus G" calculated. The point where these modulii have co-incident values is the crossover point, and the value of dynamic modulus at this point is Gc, in dyne/cm². The polydispersity index is calculated as $PI=10^6/Gc$.

ASTM D 1003-95, Transmittance Haze

The transmittance haze of inventive film was measured using a Haze-guard Plus transmission and haze meter (BYK-Gardiner, Silver Springs, Md.) according to the procedure described in ASTM D 1003-95.

Severance Properties: Dispense Testing of Films

Test specimens 1.91 cm wide and 15 cm long were slit from uncoated sample films using a razor blade cutter equipped with new blades. Test specimens were conditioned for 24 hours at 25° C. and 50% relative humidity prior to testing.

Figure 4:
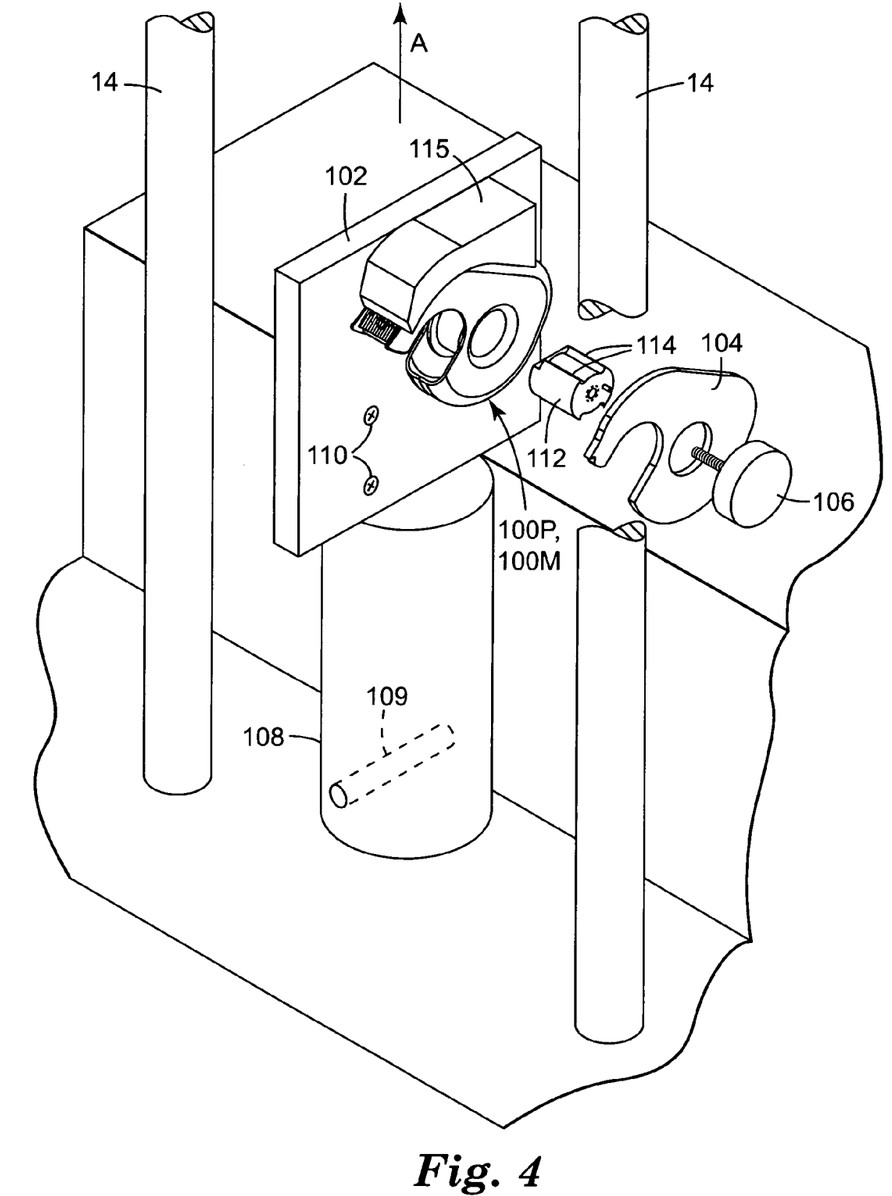
FIG. 4 is an isometric view of a test fixture used to test the severing characteristics of film according to the present invention.

The test fixture used to measure severability is shown in FIG. 4. The test fixture comprised a commercially available tape dispenser 100M (Scotch™ Cat. H-127 two-piece polystyrene molded dispenser equipped with a metal cutting blade, available as of the filing date hereof from Minnesota Mining & Manufacturing Co., St. Paul, Minn.) or commercially available tape dispenser 100P (Scotch™ Cat. 122 two-piece molded polystyrene dispenser equipped with a plastic cutting blade, available as of the filing date hereof from Minnesota Mining & Manufacturing Co., St. Paul, Minn.) mounted to a 15.2 cm×15.2 cm×1.1 cm aluminum rear mounting plate 102. The dispenser was restricted from flexing during the severing test by being placed between the rear mounting plate 102 and a 0.3 cm thick aluminum front mounting plate 104 milled to the contour of the test dispenser 100P or 100M. The test dispenser was firmly held in place between the front 104 and rear 102 mounting plates by a threaded thumbscrew 106. The rear mounting plate 102 was affixed to a 2.4 cm diameter cylindrical base mounting stud 108 by machine screws 110. The base mounting stud 108 was milled to include a 90° angle cut-out so that the rear mounting plate 102 was held in the vertical centerline of the tensile testing machine, that is, the angle between the axis of the rear mounting plate 102 and test dispenser 100P or 100M was 0° with respect to the machine centerline. The base stud 108 was affixed to the testing machine deck by locking pins inserted into drillouts 109 in the base stud.

The test dispenser 100M or 100P was mounted onto the rear mounting plate 102 by inserting the dispenser hub over an aluminum hub mounting shaft 112 which is screwed into the rear mounting plate 102. The bottom of the dispenser rested against seat 115 which prevented rotation of the dispenser during testing. The test dispenser was mounted so that the row of teeth of the dispenser cutting blade was perpendicular to the machine centerline. In this way, the film being tested was loaded substantially uniformly across its width when severed.

Figure 5:
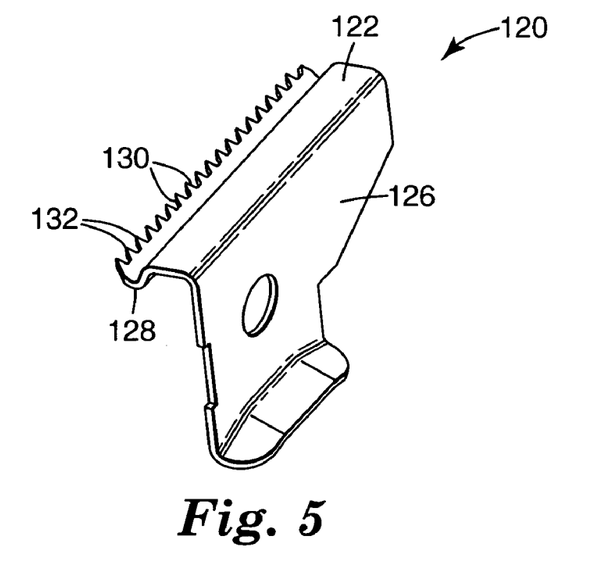
FIG. 5 is an isometric view of the metal dispenser blade useful in the tape dispenser of FIG. 3 and the test fixture of FIG. 4.
Figure 6:
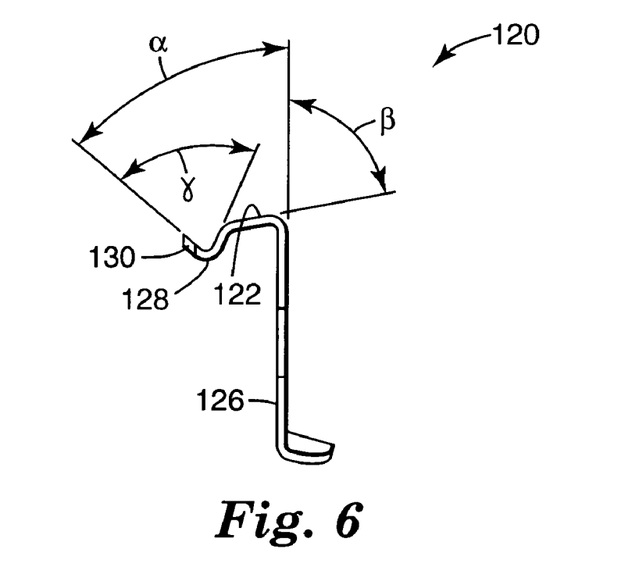
FIG. 6 is a side view of the metal dispenser blade of FIG. 5.

Dispenser 100M included a steel serrated cutting blade 120 illustrated in FIGS. 5 and 6. Steel cutting blade 120 was formed of about 0.05 cm thick nickel plated steel and included a rectangular land portion 122 at least as wide as the film 12 and about 0.3 cm long in the direction corresponding to the reference direction R of the film 12 extending across the blade. The land portion 122 defines a generally planar surface to which the test sample is temporarily secured. Blade 120 also included a blade support portion 126 at the rear edge of the land portion 122, with the land portion forming an angle β of 80° with the support 126. Blade support 126 is about 1.32 cm long. Blade 120 further included a generally U-shaped portion 128 at the edge of the land portion opposite the support portion which has a row of teeth 130 along its distal edge. Each tooth 130 is generally triangular, has a tip in or slightly lower than the plane of the land 122 and spaced from the tips of adjacent teeth 130 by about 0.12 cm, is defined by a height of about 0.06 cm, a sharpness defined by a radius of curvature of about 0.003 cm, and the apex 132 of said teeth 130 form an included angle of 60°. The teeth 130 project outward from the plane of the blade support portion 126 at an angle α of about 50°. The sides of the generally U-shaped portion 128 are at an angle γ to one another of 72°.

Figure 7:
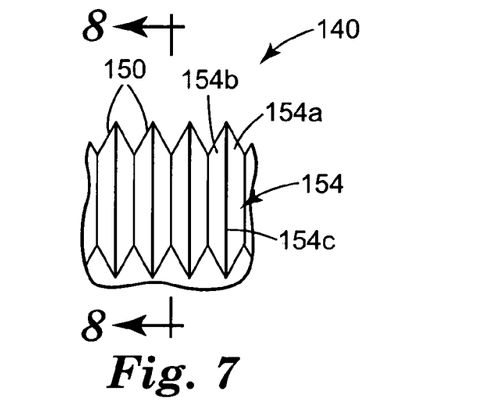
FIG. 7 is a view of a plastic dispenser blade taken in direction 7—7 of FIG. 3.
Figure 8:
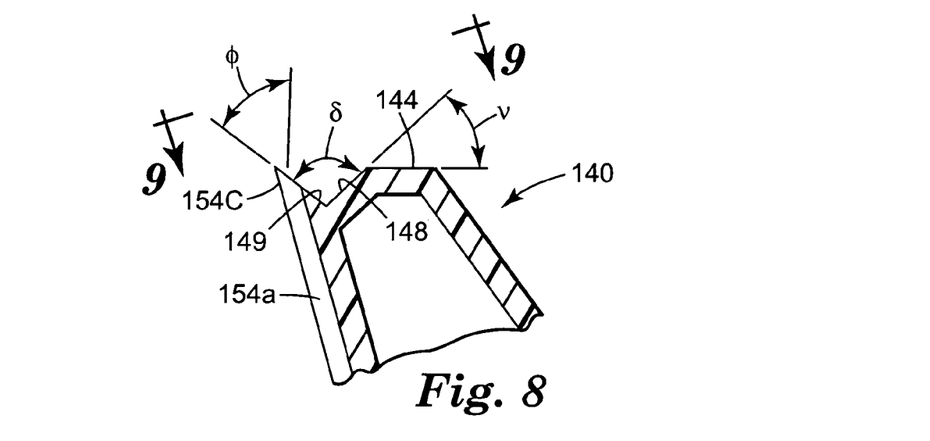
FIG. 8 is a cross-sectional view of the dispenser blade of FIG. 7 taken along line 8—8 of FIG. 7.
Figure 9:
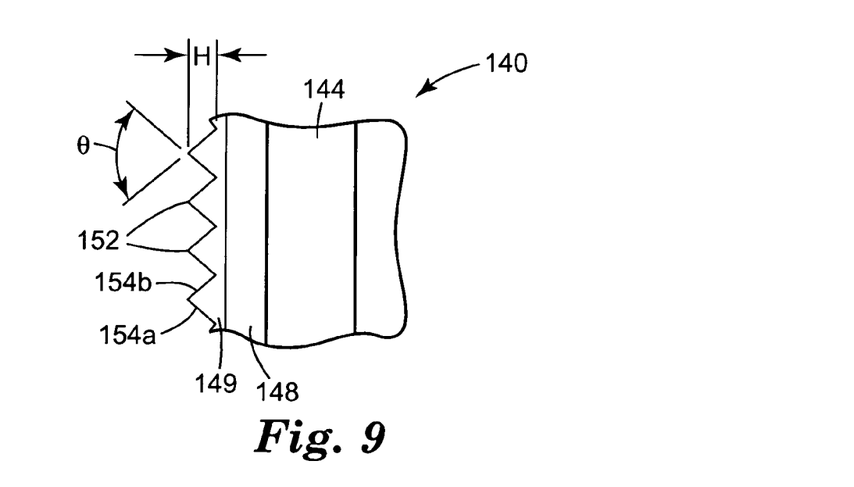
FIG. 9 is a top view of the dispenser blade of FIG. 7 taken in direction 9—9.

Dispenser 100P includes an injection-molded polystyrene blade 140 illustrated in FIGS. 7–9. Polystyrene blade 140 on dispenser 100P is integrally molded with one of the two halves of the tape dispenser 100P. Blade 140 is formed by filling the cavities of a steel mold using a typical injection molding process. As seen in FIGS. 8 and 9, blade 140 includes a land surface 144 which is about 0.35 cm wide. Land surface 144 is slightly convex, having a radius of curvature of 2.54 cm. Forward of land 144 is a V-shaped portion formed by surfaces 148 and 149 which meet at an inside angle δ of 125°. Surface 148 of the V-groove makes an angle of ν with the linear approximation of land 144 of 70°. A series of ridges 154 extend from the front of the dispenser. The ridges 154 are each formed by sides 154*a* and 154*b* which meet at ridge 154*c*. Each tooth peak 150 is formed by the intersection of surface 149 with the ridges 154. As best seen in FIGS. 7 and 9, each tooth is thereby formed by the intersection of three planes: sides 154*a* and 154*b* of ridge 154, and surface 149 of the V-shaped groove. As seen in FIG. 9, sides 154*a* and 154*b* meet an at included angle θ of 74°. As seen in FIG. 8, surface 149 forms an angle φ of 50° with edge 154*c* of ridge 154. Each tooth 150 has a tip in or slightly lower than the plane of the land surface 144 and is spaced from the tips of adjacent teeth 150 by about 0.127 cm. Each tooth has a height of about 0.020 cm, measured as the height H from the peak of the tooth to the adjoining valleys between teeth. Each tooth has an edge sharpness having a radius of curvature of about 0.010 cm.

In either test dispenser, a piece of double-coated adhesive tape (Scotch™ Cat. 665) was applied to land area 122 or 144 and the test specimen was adhered firmly to the adhesive surface of the double-coated tape with finger pressure to prevent forward motion during severance testing.

Figure 10:
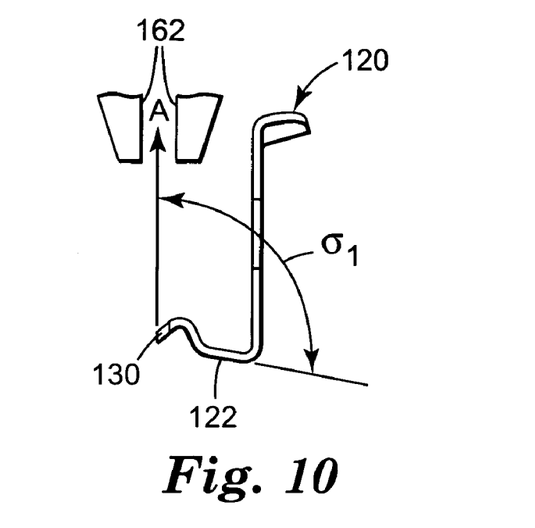
FIG. 10 is a side view of a portion of the apparatus of FIG. 4 and the metal dispenser blade of FIG. 5.
Figure 11:
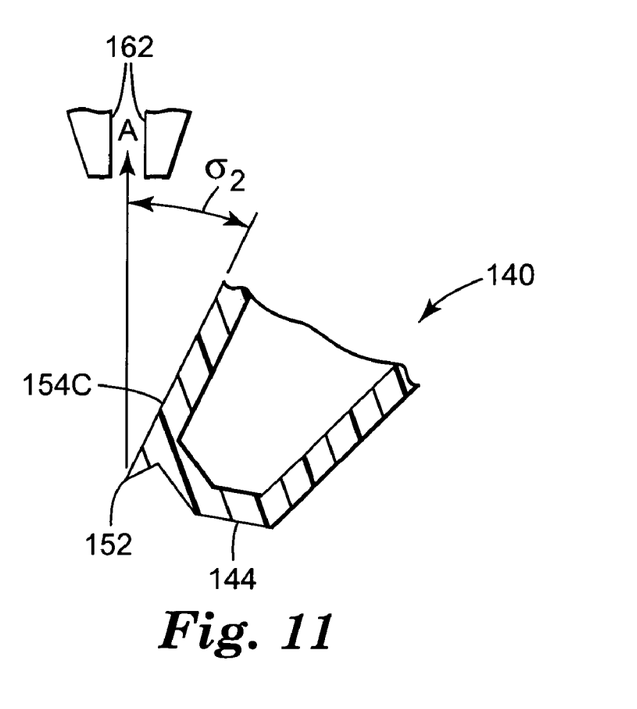
FIG. 11 is a side view of a portion of the apparatus of FIG. 4 and the plastic dispenser blade of FIG. 8.

The test specimen was aligned at an angle of 0° to the machine centerline so that the force of the dispenser was substantially evenly distributed across the width of the sample. The dispenser 100M or 100P was oriented such that the tips of the cutting blade 120 or 140 were directly under the jaws 162. For tests using the dispenser 100M with metal dispenser 120, the dispenser was oriented at an angle such that the land 122 was at an angle $\sigma_1$ of 110° relative to the vertical direction of travel A of the tester (see FIG. 10, which illustrates only the cutter blade 120 relative to the jaws 162, with the rest of the dispenser and test fixture removed for illustrative purposes only). For tests using the dispenser 100P with plastic blade 140, the dispenser was oriented at an angle such that the edge 154*c* of ridge 154 was at an angle $\sigma_2$ of 32° relative to the vertical direction of travel A of the tester (see FIG. 11, which illustrates only the cutter blade 140 relative to the jaws 162, with the rest of the dispenser and test fixture removed for illustrative purposes only).

Figure 12:
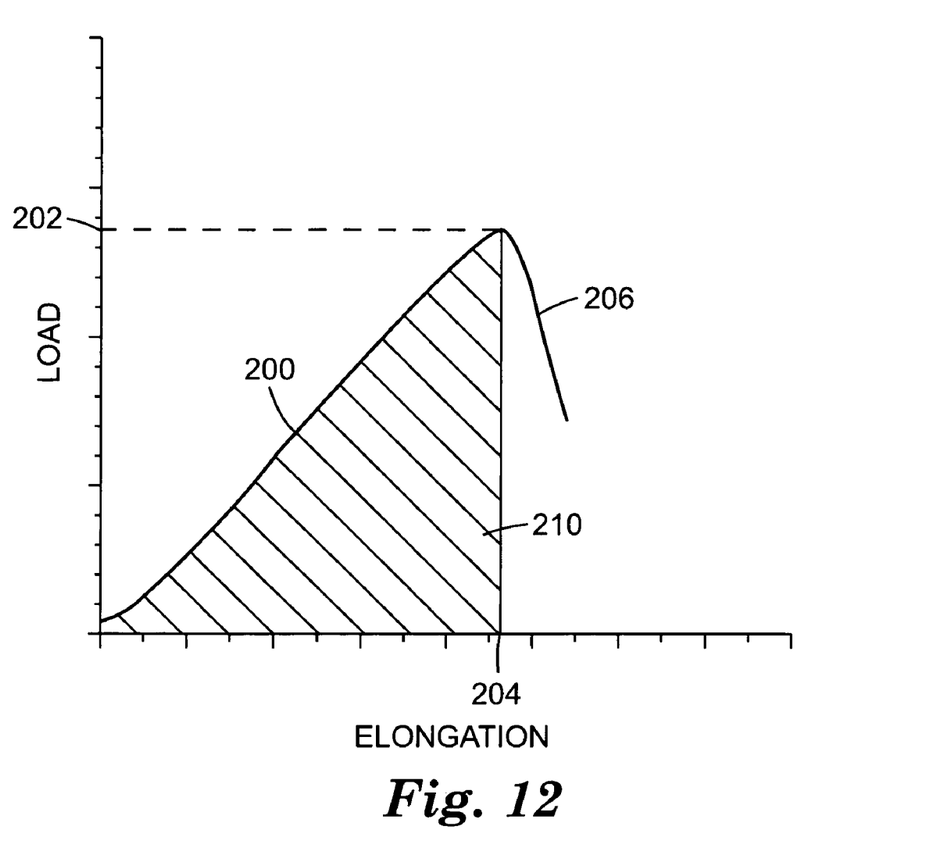
FIG. 12 is an illustration of a typical severance or dispense testing curve for a polypropylene tape backing of the present invention.

The free end of the test specimen was then gripped in the upper jaws 162 of the tensile testing machine so that the distance between the upper jaws and the cutting blade 120 or 140 was 10.2 cm. The specimen was loaded with no tension so that the cutting blade did not contact the specimen prior to the start of the test. The upper jaws were attached to the machine crosshead which traveled on support rails 14. The test specimen was next pre-loaded in tension to a value of 0.9 N to make contact with the cutting blade 120 or 140. The backing 11 was then pulled in direction A by the jaws 162 at a rate of 30 cm/minute. The load and elongation of the specimen were measured and recorded, and the energy to sever was calculated from the area under the load/elongation, as illustrated in FIG. 12, and reported in Table 1. In FIG. 12, the load is indicated along the vertical axis, with the elongation indicated on the horizontal axis. The load and elongation increase along portion 200 of the curve, until the peak load 202 is reached, where the elongation is indicated by 204. The load then decreases as the elongation continues along portion 206 of the curve. As reported herein, the energy is calculated for that portion of the curve from zero elongation to the elongation 204 at maximum load 202. It is believed that the teeth of the dispenser puncture the film at about the point of maximum load 202, at which time the load decreases as the punctures through the film propagate to complete severance.

As used herein, including the claims, the term "The Dispense Test—Metal Blade" refers to the just described test using dispenser 100M, and the term "The Dispense Test—Plastic Blade" refers to the just described test using dispenser 100P.

PREPARATION OF EXAMPLES

Preparation of Resin Master Batches

Sample resin master batches with a weight composition of low melt flow resin A and high melt flow resin B of 50:50 were prepared for making the biaxially oriented substrate Examples as follows. First, 50 wt % of FINA 3374 isotactic polypropylene homopolymer resin was compounded with 50 wt % of each of the three following resins: FINA 3860 polypropylene (resulting in Master Batch X); FINA 3892 polypropylene (resulting in Master Batch Y); or FINA 98035 polypropylene (resulitng in Master Batch Z); all supplied by FINA Oil & Chemical Co., Dallas, Tex. The polypropylene master batches were mixed by feeding the separate polypropylene resins into a 50-mm twin screw extruder using a K-Tron T-35 volumetric feeder. The extruder was a 50 mm 10:1 L/D co-rotating Baker-Perkins twin screw. A 5-hole stranding die was mounted on the extruder and the extrudate strands were fed into a water bath prior to pelletizing. The extruder was operated at a rate of 48.5 lbs./hour at a speed of 275 rpm and a die temperature of 232° C. The final weight composition and melt flow rate were obtained by addition of neat homopolymer resin to the master batch resin to achieve the desired weight percentages reported in Table 1 below.

TABLE 1

Weight Ratios of Polypropylene Resins

| | Neat Isotactic PP Resins | | | | Master Batch Resins | | |
|---|---|---|---|---|---|---|---|
| Example | 3374 | 3860 | 3982 | 98035 | X | Y | Z |
| 1 | 100 | — | — | — | — | — | — |
| 2 | 80 | — | — | — | 20 | — | — |
| 3 | 60 | — | — | — | 40 | — | — |
| 4 | 40 | — | — | — | 60 | — | — |
| 5 | 100 | — | — | — | — | — | — |
| 6 | 40 | — | — | — | 60 | — | — |
| 7 | 20 | — | — | — | 80 | — | — |
| 8 | 100 | — | — | — | — | — | — |
| 9 | 40 | — | — | — | 60 | — | — |
| 10 | 100 | — | — | — | — | — | — |
| 11 | 50 | — | — | — | 50 | — | — |
| 12 | — | 50 | — | — | 50 | — | — |
| 13 | — | 100 | — | — | — | — | — |
| 14 | 50 | — | — | — | — | 50 | — |

TABLE 1-continued

| | Weight Ratios of Polypropylene Resins | | | | | | |
|---|---|---|---|---|---|---|---|
| | Neat Isotactic PP Resins | | | | Master Batch Resins | | |
| Example | 3374 | 3860 | 3982 | 98035 | X | Y | Z |
| 15 | — | — | 50 | — | — | 50 | — |
| 16 | — | — | — | 50 | — | — | 50 |

Examples 1–4

The appropriate resin mixture was fed into the feed hopper of a 4.45 cm single screw extruder manufactured from H.P.M (Mt. Gilead, Ohio) having an extruder barrel temperature adjusted to produce a stable homogeneous melt of about 250–260° C. The polypropylene melt was extruded through a 17.8 cm single manifold sheet die onto a rotating water cooled steel casting wheel which had about 50–60° C. water circulating through it. The cast sheet was next passed through a quenching water bath maintained at about 30° C. to produce a cast sheet having a thickness of about 0.16 cm.

Sequentially biaxially oriented polypropylene biaxially oriented substrates were prepared by a process known as the sequential tenter process. The cast sheet was passed over a first series of heating rolls maintained internally from about 127° C. to 136° C., and then stretched between two nipped drawing rolls rotating at different speeds to attain a first draw ratio of 5.0:1 in extrusion or casting direction. The uniaxially stretched sheet was then fed into a tenter oven with multiple heat zones having temperatures ranging from 158° to 175° C. and stretched or oriented between two tenter rails in the direction perpendicular to the first stretching at a draw ratio of about 9:1. The resulting film had a thickness of about 0.003–0.0035 cm and was cooled in air and annealed on an annealing drum with an internal temperature of 120° C. The edges were subsequently razor slit and the film wound onto a master roll. The film was slit into useful sample widths using a razor blade cutter equipped with fresh blades.

Examples 5–7

Simultaneously biaxially oriented polypropylene Examples 5–7 were prepared by a process known as the simultaneous tenter process. First, the appropriate resin mixture was extruded to produce a stable homogeneous melt having a melt temperature of about 257° C. The polypropylene melt was cast onto a water cooled steel casting wheel rotating at about 10 meters per minute which had about 11° C. water circulating through it. The cast sheet was next passed through a quenching water bath maintained at about 20° C. to produce a cast sheet having a thickness of about 0.15–0.2 cm.

The cast film was simultaneous stretched in longitudinal and transverse directions using a diverging spindle simultaneous biaxial orienting tenter equipped with 7:1 stretching spindles, at a line speed of 80–85 meters per minute and a stretching temperature of about 175–180° C. to a final balanced area stretching ratio of about 50:1.

Examples 8–16

Examples 8–16 were cast as described above in Examples 1–4.

Examples 8–9 were simultaneously stretched in two perpendicular directions using a laboratory two-way film stretching machine known as a frame or batch stretcher as follows. The cast film sheet of 0.16 cm thickness was cut into square tablets of 6.83 cm on a side and held in the stretching oven of the batch stretcher by edgewise gripping with a series of clips to leave a stretchable sample of 5.08 cm on a side. The tablet was pre-heated for 90 seconds at 155° C., and stretched at a rate of about 300%/second in the reference direction and about 250%/second in the direction perpendicular to the first direction to a final area stretch ratio of about 40:1. Samples were immediately removed from the stretching machine to cool. The film had a nominal thickness of about 0.030 cm. The film was slit into useful sample widths using a razor blade cutter equipped with fresh blades.

Examples 10–16 were prepared by stretching the cast sheet described above simultaneously in two perpendicular directions using a laboratory two-way film stretching machine known as a frame or batch stretcher as follows. The cast film sheet of 0.16 cm thickness was cut into square tablets of 6.83 cm on a side and held in the stretching oven of the batch stretcher by edgewise gripping with a series of clips to leave a stretchable sample of 5.08 cm on a side. The tablet was pre-heated for 90 seconds at 155° C., then simultaneously stretched at a rate of about 300%/sec in the reference direction and about 300%/sec in the direction perpendicular to the reference direction to a final area stretch ratio of 50:1. The film was slit into useful sample widths using a razor blade cutter equipped with fresh blades.

Samples prepared in accordance with Examples 1–10, 12–13, and 15–16 were tested for severability by the Dispense Test—Metal Blade. Samples prepared in accordance with Examples 5, 7, and 10–15 were tested for severability by the Dispense Test—Plastic Blade. Samples from each Example were also tested for melt flow rate and weight average molecular weight Mw by the methods described above. Samples from each Example were also tested for tensile elongation at break by the method described above.

TABLE 2

Test Results

| Ex. | MFR[1] | Mw[2] | PI[3] | Test[4] | Peak[5] | Energy[6] | Tensile Elong.[7] | Dispense Elong.[8] | Haze[9] |
|---|---|---|---|---|---|---|---|---|---|
| 1 | 4.4 | 420 | | M | 19.5 | 600 | 190 | 3.18 | 1.06 |
| 2 | 5.4 | 490 | | M | 19.1 | 561 | 188 | 2.97 | 0.91 |
| 3 | 8.0 | 420 | | M | 14.1 | 241 | 167 | 1.80 | 0.07 |
| 4 | 11.2 | 350 | | M | 13.2 | 235 | 167 | 1.86 | 0.47 |
| 5 | 5.8 | | | M | 22.4 | 740 | 98 | 3.70 | 4.56 |
| 6 | | | | M | 16.9 | 270 | 109 | 1.88 | 3.30 |
| 7 | 12.5 | | | M | 16.1 | 244 | 121 | 1.82 | |
| 8 | 7.5 | | | M | 14.6 | 310 | 70 | 1.77 | 1.23 |

TABLE 2-continued

Test Results

| Ex. | MFR[1] | Mw[2] | PI[3] | Test[4] | Peak[5] | Energy[6] | Tensile Elong.[7] | Dispense Elong.[8] | Haze[9] |
|---|---|---|---|---|---|---|---|---|---|
| 9 | 19.6 | | | M | 12.8 | 249 | 55 | 1.56 | 0.79 |
| 10 | 3.2 | 418 | 3.4 | M | 23.8 | 634 | 87 | 2.89 | |
| 12 | 54.0 | 231 | 4.9 | M | 14.3 | 277 | 97 | 1.86 | |
| 13 | 100.0 | 183 | 6.5 | M | 14.5 | 269 | 103 | 1.71 | |
| 15 | 49.0 | | 6.7 | M | 17.0 | 285 | 90 | 1.86 | |
| 16 | 45.0 | 224 | 4.9 | M | 15.5 | 248 | 86 | 1.72 | |
| 5 | 5.8 | 197 | | P | 29.8 | 937 | 98 | 3.20 | 4.56 |
| 7 | 12.5 | 132 | | P | 26.7 | 591 | 121 | 2.49 | 3.30 |
| 10 | 3.2 | 418 | 3.4 | P | 43.1 | 3370 | 87 | 7.31 | |
| 11 | 6.7 | 320 | 4.1 | P | 38.3 | 2920 | 93 | 6.82 | |
| 12 | 54.0 | 231 | 4.9 | P | 20.8 | 532 | 97 | 1.86 | |
| 13 | 100.0 | 183 | 6.5 | P | 17.2 | 286 | 103 | 1.71 | |
| 14 | 6.9 | 249 | 4.9 | P | 34.2 | 1895 | 85 | 5.05 | |
| 15 | 49.0 | | 6.7 | P | 23.1 | 645 | 90 | 2.61 | |

[1]Melt flow rate reported in grams/10 minutes measured according to ASTM D 1238-95, Flow Rates of Thermoplastics by Extrusion Plastometer, Procedure B, Condition 230/2.16.
[2]The weight average molecular weights (Mw) reported in 1000 grams/mole were measured using ASTM D 5296-92, Molecular Weight Averages by Size Exclusion Chromatography (SEC).
[3]PI: Polydispersity Index = $10^6$/Gc where Gc = rheometer crossover modulus value (dyne/cm$^2$).
[4]M = Dispense Test – Metal Blade; P = Dispense Test – Plastic Blade.
[5]Peak load measured during Dispense Test, reported as (N/19.1 mm).
[6]Energy to dispense measured by Dispense Test – Metal Blade, and/or Dispense Test – Plastic Blade, and reported as N-cm/cm$^2$.
[7]Tensile elongation-at-break was measured by the procedures described in ASTM D-882-95A, "Tensile Properties of Thin Plastic Sheeting," Method A and is reported in percent.
[8]Elongation measured during Dispense Test – Metal Blade, and/or Dispense Test – Plastic Blade, reported in percent.
[9]Measured by ASTM D1003-95 and reported in percent.

The tests and test results described above are intended solely to be illustrative, rather than predictive, and variations in the testing procedure can be expected to yield different results.

The present invention has now been described with reference to several embodiments thereof. The foregoing detailed description and examples have been given for clarity of understanding only. No unnecessary limitations are to be understood therefrom. The disclosures of all patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. An adhesive tape comprising:
 a backing and a layer of adhesive on said backing;
 wherein said backing has an energy to sever of up to 350 N-cm/cm2 when severed according to The Dispense Test—Metal Blade and has a tensile elongation to break from above about 55% to about 170%; and
 wherein said backing comprises a biaxially oriented substrate, wherein said biaxially oriented substrate comprises an isotactic polypropylene composition having a melt flow rate of at least 12 grams/10 minutes, and wherein said biaxially oriented substrate has a melt flow rate of at least 12 grams/10 minutes.

2. The adhesive tape of claim 1, wherein said biaxially oriented substrate comprises a monolayer substrate.

3. The adhesive tape of claim 1, wherein said biaxially oriented substrate comprises a multilayer film, and wherein with respect to the total thickness of said biaxially oriented substrate, at least 50% of the thickness of said biaxially oriented substrate comprises at least 90% isotactic polypropylene.

4. The adhesive tape of claim 3, wherein a first plurality of said layers each comprise at least 90% isotactic polypropylene, and wherein said first plurality of layers comprise at least 50% of the total thickness of said biaxially oriented substrate.

5. The adhesive tape of claim 1, wherein said biaxially oriented substrate has a weight average molecular weight of at least 100,000.

6. The adhesive tape of claim 1, wherein said bucking has an elongation of up to 4% when severed according to The Dispense Test—Metal Blade.

7. The adhesive tape of claim 1, wherein said biaxially oriented substrate has a melt flow rate of at least 20 grams/10 minutes.

8. The adhesive tape of claim 1, wherein said biaxially oriented substrate has a melt flow rate of from greater than 12 to 100 grams/10 minutes.

9. The adhesive tape of claim 1, wherein said polypropylene composition has an isotacticity greater than about 90%.

10. The adhesive tape of claim 1, wherein said polypropylene composition has a melt flow rate of at least 20 grams/10 minutes.

11. The adhesive tape of claim 1, wherein said polypropylene composition has a melt flow rate of from greater than 12 to 100 grams/10 minutes.

12. The adhesive tape of claim 1, wherein said polypropylene composition comprises a blend of a first isotactic polypropylene having a first melt flow rate and a second isotactic polypropylene having a second melt flow rate greater than said first melt flow rate.

13. The adhesive tape of claim 12, wherein said first polypropylene has a weight average molecular weight of at least 350,000 and said second polypropylene has a weight average molecular weight of at least 100,000.

14. The adhesive tape of claim 1, wherein said biaxially oriented substrate has been oriented to a final area stretch ratio of at least 36:1.

15. The adhesive tape of claim 14, wherein said biaxially oriented substrate has been simultaneously biaxially oriented.

16. The adhesive tape of claim 14, wherein said biaxially oriented substrate has been sequentially biaxially oriented.

17. The adhesive tape of claim 1, wherein said adhesive comprises a pressure sensitive adhesive.

18. The adhesive tape of claim 17, wherein said adhesive tape is spirally wound so as to provide a roll of tape.

19. The adhesive tape of claim 18, wherein said roll is mounted on a dispenser including a metal cutting blade.

20. The adhesive tape of claim 18, wherein said roll is mounted on a dispenser including a plastic cutting blade.

21. A backing comprising a biaxially oriented substrate, wherein said biaxially oriented substrate comprises an isotactic polypropylene composition having a melt flow rate of at least 12 grams/10 minutes, wherein said biaxially oriented substrate has a melt flow rate greater than at least 12 grams/10 minutes and a tensile elongation to break from above about 55% to about 170%.

22. The backing of claim 21, wherein said biaxially oriented substrate comprises a monolayer substrate.

23. The backing of claim 21, wherein said biaxially oriented substrate comprises a multilayer film, and wherein with respect to the total thickness of said biaxially oriented substrate, at least 50% of the thickness of said biaxially oriented substrate comprises at least 90% isotactic polypropylene.

24. The backing of claim 23, wherein a first plurality of said layers each comprise at least 90% isotactic polypropylene, and wherein said first plurality of layers comprise at least 50% of the total thickness of said biaxially oriented substrate.

25. The backing of claim 21, wherein said biaxially oriented substrate has a weight average molecular weight of at least 100,000.

26. The backing of claim 21, wherein said backing has an elongation of up to 4% when severed according to The Dispense Test—Plastic Blade.

27. The backing of claim 21, wherein said biaxially oriented substrate has a melt flow rate of at least 20 grams/10 minutes.

28. The backing of claim 21, wherein said biaxially oriented substrate has a melt flow rate of from greater than 12 to 100 grams/10 minutes.

29. The backing of claim 21, wherein said polypropylene composition has a weight average molecular weight of at least 100,000.

30. The backing of claim 21, wherein said polypropylene composition has an isotacticity greater than about 90%.

31. The backing of claim 21, wherein said polypropylene composition has a melt flow rate of at least 20 grams/10 minutes.

32. The backing of claim 21, wherein said polypropylene composition comprises a blend of a first isotactic polypropylene having a first melt flow rate and a second isotactic polypropylene having a second melt flow rate greater than said first melt flow rate.

33. The backing of claim 32, wherein said first polypropylene has a weight average molecular weight of at least 350,000 and said second polypropylene has a weight average molecular weight of at least 100,000.

34. The backing of claim 21, wherein said biaxially oriented substrate has been oriented to a final area stretch ratio of at least 36:1.

35. The backing of claim 34, wherein said biaxially oriented substrate has been simultaneously biaxially oriented.

36. The backing of claim 34, wherein said biaxially oriented substrate has been sequentially biaxially oriented.

37. The backing of claim 21, further comprising a layer of adhesive on said backing.

38. The backing of claim 37, wherein said adhesive comprises a pressure sensitive adhesive.

39. The backing of claim 38, wherein said adhesive tape is spirally wound so as to provide a roll of tape.

40. The backing of claim 39, wherein said roll is mounted on a dispenser including a metal cutting blade.

41. The backing of claim 39, wherein said roll is mounted on a dispenser including a plastic cutting blade.

42. The backing of claim 21 wherein said backing has an energy to sever of up to 700 N-cm/cm2 when severed according to The Dispense Test—Plastic Blade.

* * * * *

UNITED STATES PATENT AND TRADEMARK OFFICE
CERTIFICATE OF CORRECTION

PATENT NO. : 7,186,458 B2  
APPLICATION NO. : 10/762053  
DATED : March 6, 2007  
INVENTOR(S) : Scott D. Pearson It is certified that error appears in the above-identified patent and that said Letters Patent is hereby corrected as shown below:

Title Page  
Item -56- (OTHER PUBLICATIONS) Line 1, Delete "2d" and insert -- 2nd -- therefor.

Title Page  
Item -56- (OTHER PUBLICATIONS) Line 4, After "GB," insert -- Class A17 -- therefor.

Column 2  
Line 14, Delete "polyproylene" and insert -- polypropylene --, therefor.

Column 16  
Line 35 (approx.), Delete "(resulitng" and insert --(resulting --, therefor.

Column 19  
Line 57 (approx.), In Claim 1, delete "N-cm/cm2" and insert -- N-cm/cm$^2$ --, therefor.

Column 20  
Line 49 (approx.), In Claim 6, delete "bucking" and insert --"backing"-- therefor.

Column 22  
Line 48 (approx.), In Claim 42, delete "N-cm/cm2" and insert -- N-cm/cm$^2$ -- therefor.

Signed and Sealed this

Twenty-fourth Day of April, 2007

JON W. DUDAS  
*Director of the United States Patent and Trademark Office*